(12) United States Patent
Kirby

(10) Patent No.: US 10,471,520 B2
(45) Date of Patent: Nov. 12, 2019

(54) DRIVE MULTIPLYING DEVICE

(71) Applicant: Charles Kirby, Louisville, KY (US)

(72) Inventor: Charles Kirby, Louisville, KY (US)

(*) Notice: Subject to any disclaimer, the term of this patent is extended or adjusted under 35 U.S.C. 154(b) by 701 days.

(21) Appl. No.: 15/185,491

(22) Filed: Jun. 17, 2016

(65) Prior Publication Data
US 2017/0361382 A1 Dec. 21, 2017

(51) Int. Cl.
B23B 39/16 (2006.01)
F16H 1/06 (2006.01)

(52) U.S. Cl.
CPC ........ *B23B 39/162* (2013.01); *B23B 2260/07* (2013.01); *F16H 1/06* (2013.01)

(58) Field of Classification Search
CPC .................................................. B23B 39/162
USPC .................... 74/665 G, 665 GA; 408/53, 117
See application file for complete search history.

(56) References Cited

U.S. PATENT DOCUMENTS

| 2,349,240 | A | * | 5/1944 | Aiman | B23B 39/162 408/117 |
| 2,492,391 | A | * | 12/1949 | Minek | B23B 39/162 408/117 |
| 2,549,490 | A | * | 4/1951 | Kuhl | B23B 39/165 408/127 |
| D168,098 | S | | 11/1952 | Klein | |
| 2,706,918 | A | | 4/1955 | Blatt | |
| 2,879,675 | A | | 3/1959 | Morris | |
| 2,884,818 | A | * | 5/1959 | Speckin | B23B 39/162 408/53 |
| 4,678,378 | A | | 7/1987 | Koczarski | |
| 5,205,682 | A | | 4/1993 | Jinkins | |
| 6,007,277 | A | | 12/1999 | Olson et al. | |
| 7,059,812 | B2 | | 6/2006 | McFarlane | |
| 9,050,662 | B2 | | 6/2015 | Diamond et al. | |

FOREIGN PATENT DOCUMENTS

WO    WO9834746    8/1998

\* cited by examiner

*Primary Examiner* — William C Joyce

(57) ABSTRACT

A drive multiplying device for simultaneous drilling of multiple holes includes a housing. A drive shaft is rotationally coupled to and positioned through a first face of the housing. A first end of the drive shaft extends from the first face of the housing. A plurality of second shafts is rotationally coupled to and positioned through a second face of the housing. A first terminus of each second shaft extends from the second face of the housing. A gear set is positioned in the housing and is gearedly coupled to the drive shaft as well as each of the second shafts. The first end of the drive shaft is configured to couple to a rotary tool. The drive shaft is positioned to compel the gear set to rotate the second shafts. Drill bits coupled to the first termini of the second shafts are rotated concurrently with the drive shaft.

13 Claims, 4 Drawing Sheets

DRIVE MULTIPLYING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to drive multiplying devices and more particularly pertains to a new drive multiplying device for simultaneous drilling of multiple holes.

BRIEF SUMMARY OF THE INVENTION

An embodiment of the disclosure meets the needs presented above by generally comprising a housing. A drive shaft is rotationally coupled to and positioned through a first face of the housing. A first end of the drive shaft extends from the first face of the housing. A plurality of second shafts is rotationally coupled to and positioned through a second face of the housing. A first terminus of each second shaft extends from the second face of the housing. A gear set is positioned in the housing and is gearedly coupled to the drive shaft as well as each of the second shafts. The first end of the drive shaft is configured to couple to a rotary tool. The drive shaft is positioned to compel the gear set to rotate the second shafts. Drill bits coupled to the first termini of the second shafts are rotated concurrently with the drive shaft.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
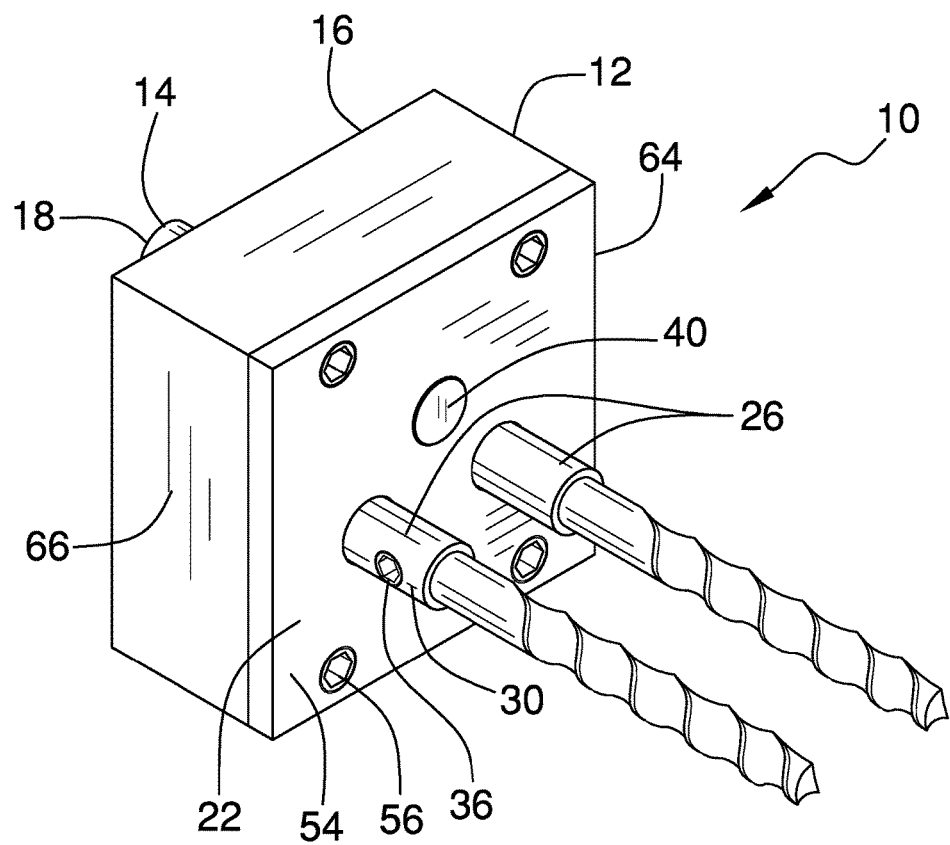
FIG. 1 is an isometric perspective view of a drive multiplying device according to an embodiment of the disclosure.
Figure 2:
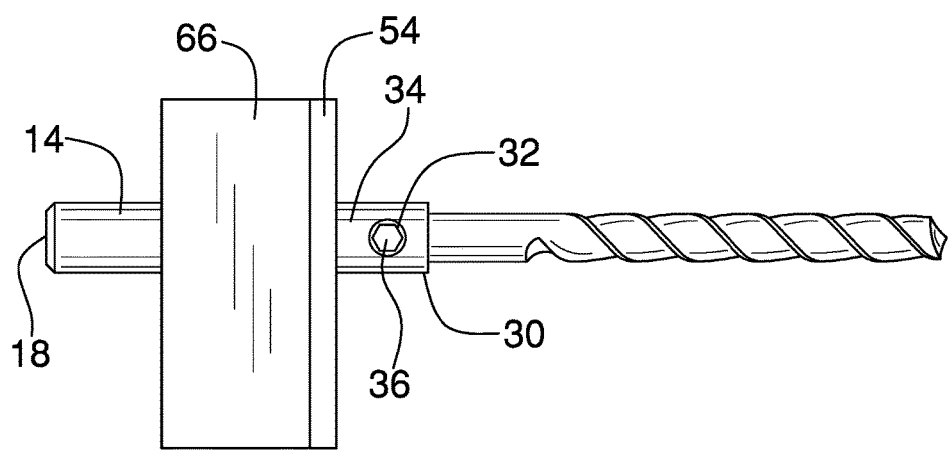
FIG. 2 is a side view of an embodiment of the disclosure.
Figure 3:
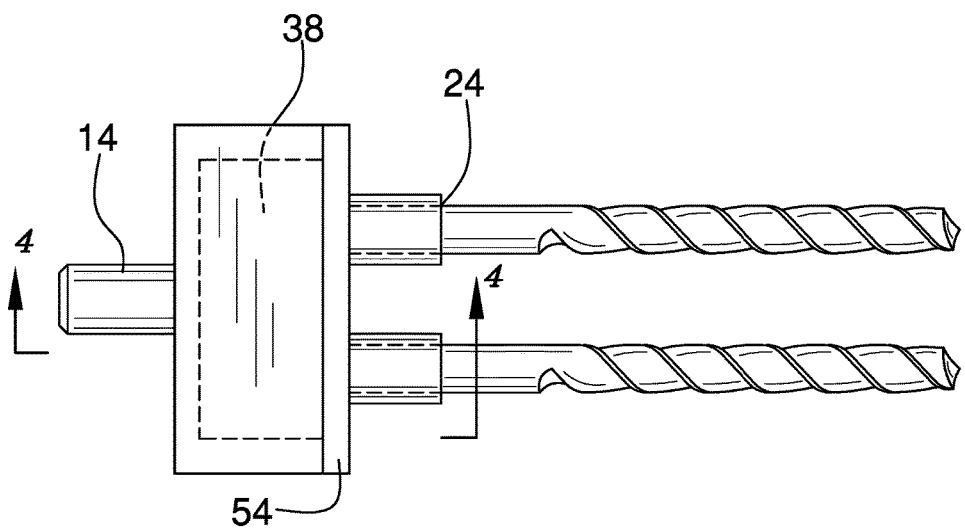
FIG. 3 is a bottom view of an embodiment of the disclosure.
Figure 4:
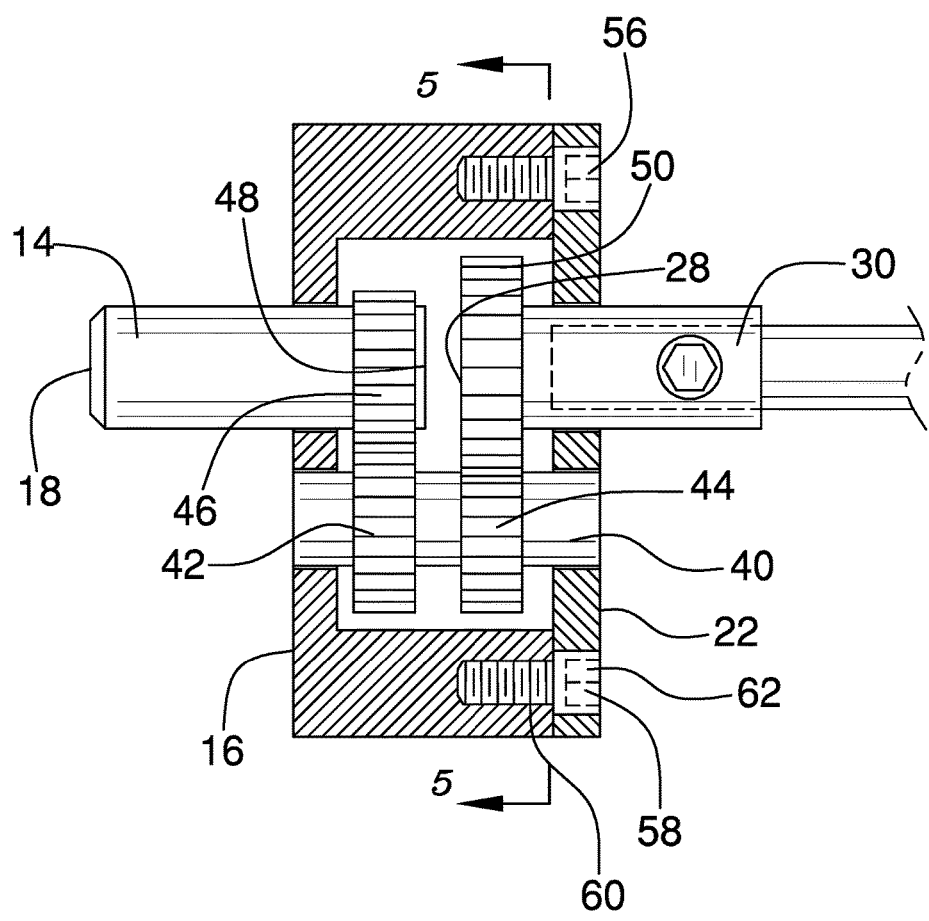
FIG. 4 is a cross-sectional view of an embodiment of the disclosure.
Figure 5:
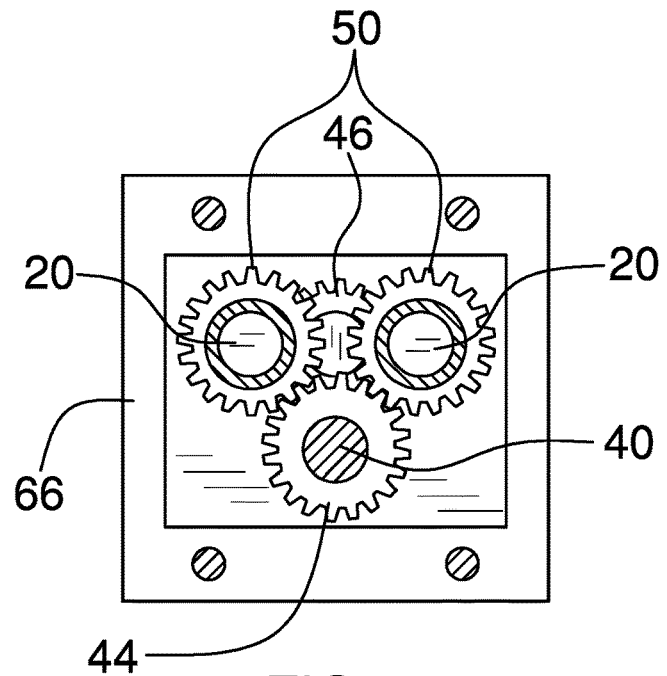
FIG. 5 is a cross-sectional view of an embodiment of the disclosure.
Figure 6:
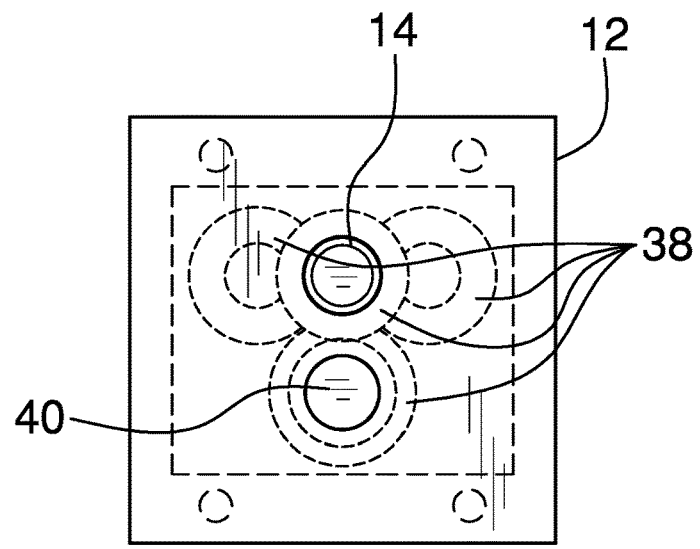
FIG. 6 is a cross-sectional view of an embodiment of the disclosure.

With reference now to the drawings, and in particular to FIGS. 1 through 6 thereof, a new drive multiplying device embodying the principles and concepts of an embodiment of the disclosure and generally designated by the reference numeral 10 will be described.

As best illustrated in FIGS. 1 through 6, the drive multiplying device 10 generally comprises a housing 12. The housing 12 is substantially rectangularly box shaped. The housing 12 comprises aluminum. A drive shaft 14 is rotationally coupled to and positioned through a first face 16 of the housing 12. A first end 18 of the drive shaft 14 extends from the first face 16 of the housing 12. The first end 18 is configured to couple to a rotary tool.

A plurality of second shafts 20 is rotationally coupled to and positioned through a second face 22 of the housing 12. A first terminus 24 of each second shaft 20 extends from the second face 22 of the housing 12. Each first terminus 24 is configured to couple to a drill bit. In one embodiment, the plurality of second shafts 20 comprises two second shafts 20.

Each of a plurality of couplers 26 is coupled to the first terminus 24 of a respective second shaft 20. Each coupler 26 is positioned on the respective second shaft 20 such that the coupler 26 is configured to couple a drill bit to the respective second shaft 20. In one embodiment, each coupler 26 comprises a collar 30 that is coupled to the first terminus 24 of the respective second shaft 20. A penetration 32 is positioned through a wall 34 of the collar 30. The penetration 32 is threaded. The coupler 26 comprises a grub screw 36 that is complementary to the penetration 32. The grub screw 36 is configured to thread into the penetration 32 and to tighten onto a respective drill bit positioned in the collar 30, such that the drill bit is coupled to the second shaft 20.

A gear set 38 is positioned in the housing 12. The gear set 38 is gearedly coupled to the drive shaft 14 and each of the plurality of second shafts 20. In one embodiment, the gear set 38 is positioned is the housing 12 such that each of the plurality of second shafts 20 rotates in the same direction that the drive shaft 14 is rotated.

In another embodiment, the gear set 38 comprises an idler shaft 40 that is rotationally coupled to and extends between the first face 16 and the second face 22 of the housing 12. A first gear 42 is coupled to the idler shaft 40 proximate to the first face 16. A second gear 44 is coupled to the idler shaft 40 proximate to the second face 22. A drive gear 46 is coupled to the drive shaft 14 proximate to a second end 48 of the drive shaft 14. The drive gear 46 is gearedly coupled to the first gear 42. Each of a pair of sprockets 50 is coupled to a respective second shaft 20 proximate to a second terminus 28 of the respective second shaft 20. The sprockets 50 are gearedly coupled to the second gear 44. The drive gear 46 is positioned to compel rotation of the idler shaft 40. The idler shaft 40 is positioned to compel rotation of the pair of sprockets 50 and the second shafts 20. Drill bits coupled to the first termini 24 of the second shafts 20 are rotated.

In one embodiment, the first gear 42, the second gear 44, the drive gear 46 and the pair of sprockets 50 comprise spur gears 52.

The second face 22 of the housing 12 comprises a plate 54 that is reversibly couplable to the housing 12. A plurality of fasteners 56 is configured to reversibly couple the plate 54 to the housing 12. In one embodiment, the plurality of fasteners 56 comprises four fasteners 56. The plurality of fasteners 56 comprises a plurality of first holes 58, a plurality of second holes 60, and a plurality of set screws 62. The plurality of first holes 58 is positioned through the plate 54 proximate to a perimeter 64 of the plate 54. The plurality of second holes 60 is positioned in a sidewall 66 of the housing 12. The second holes 60 are threaded. Each second hole 60 is alignable with an associated first hole 58. The set screws 62 are complementary to the second holes 60. Each second hole 60 is positioned to align with the associated first hole 58, such that a respective set screw 62 is positioned to insert through the associated the first hole 58. The set screw 62 is positioned for screwed coupling to the sidewall 66 to reversibly couple the plate 54 to the housing 12.

In use, the grub screw 36 is configured to tighten onto a respective drill bit positioned in the collar 30, such that the drill bit is coupled to the second shaft 20. The first end 18 of the drive shaft 14 is configured to couple to a rotary tool, such that the rotary tool is configured to compel rotation of the drive shaft 14. The drive gear 46 is coupled to the drive shaft 14 and is positioned to compel rotation of the idler shaft 40. The idler shaft 40 is positioned to compel rotation of the pair of sprockets 50 and the second shafts 20. Drill bits coupled to the first termini 24 of the second shafts 20 are rotated concurrently with the drive shaft 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drive multiplying device comprising:
   a housing;
   a drive shaft rotationally coupled to and positioned through a first face of said housing, wherein a first end of said drive shaft extends from said first face of said housing, said first end being configured for coupling to a rotary tool;
   a plurality of second shafts rotationally coupled to and positioned through a second face of said housing, wherein a first terminus of each said second shaft extends from said second face of said housing, each said first terminus being configured for coupling to a drill bit, each of said second shafts being elongated and oriented coplanar with said drive shaft;
   a gear set positioned in said housing, said gear set being gearedly coupled to said drive shaft and each of said plurality of second shafts, said gear set comprising:
     an idler shaft rotationally coupled to and extending between said first face and said second face of said housing, said idler shaft being vertically offset relative to said drive shaft;
     a first gear coupled to said idler shaft proximate to said first face;
     a second gear coupled to said idler shaft proximate to said second face;
     a drive gear coupled to said drive shaft proximate to a second end of said drive shaft, said drive gear being gearedly coupled to said first gear;
     a pair of sprockets, each said sprocket being coupled to a respective said second shaft proximate to a second terminus of said respective said second shaft wherein each of said sprockets is positioned within a plane spaced from and parallel to said drive gear, a distance between outer edges of said sprockets being less than a diameter of said drive gear, said sprockets being gearedly coupled to said second gear; and
     wherein said drive gear is positioned to compel rotation of said idler shaft, such that said idler shaft is positioned to compel rotation of said pair of sprockets and said second shafts, wherein the drill bits coupled to said first termini of said second shafts are rotated; and
   wherein said first end of said drive shaft is configured for coupling to a rotary tool, such that said drive shaft is positioned to compel said gear set to rotate said second shafts, such that drill bits coupled to said first termini of said second shafts are rotated concurrently with said drive shaft.

2. The device of claim 1, further including said housing being substantially rectangularly box shaped.

3. The device of claim 1, further including said housing comprising aluminum.

4. The device of claim 1, further including said plurality of second shafts comprising two said second shafts.

5. The device of claim 1, further including a plurality of couplers, each said coupler being coupled to a first terminus of a respective said second shaft, wherein each said coupler is positioned on a respective said second shaft such that said coupler is configured to couple a drill bit to said respective said second shaft.

6. The device of claim 5, further including each said coupler comprising:
- a collar coupled to said first terminus of said respective said second shaft;
- a penetration positioned through a wall of said collar, said penetration being threaded;
- a grub screw complementary to said penetration; and
- wherein said grub screw is positioned to thread into said penetration such that said grub screw is configured for tightening onto a respective drill bit positioned in said collar, such that the drill bit is coupled to said second shaft.

7. The device of claim 1, further including said gear set being positioned is said housing such that each of said plurality of second shafts rotates in the same direction that said drive shaft is rotated.

8. The device of claim 1, further including said first gear, said second gear, said drive gear and said pair of sprockets comprising spur gears.

9. The device of claim 1, further including said second face of said housing comprising a plate, said plate being reversibly couplable to said housing.

10. The device of claim 9, further including a plurality of fasteners configured to reversibly couple said plate to said housing.

11. The device of claim 10, further including said plurality of fasteners comprising four said fasteners.

12. The device of claim 10, further including said plurality of fasteners comprising:
- a plurality of first holes positioned through said plate proximate to a perimeter of said plate;
- a plurality of second holes being positioned in a sidewall of said housing, said second holes being threaded, each said second hole being alignable with an associated said first hole;
- a plurality of set screws, said set screws being complementary to said second holes; and
- wherein each said second hole is positioned for alignment with said associated said first hole, such that a respective said set screw is positioned for insertion through said associated said first hole and screwed coupling to said sidewall to reversibly couple said plate to said housing.

13. A drive multiplying device comprising:
- a housing, said housing being substantially rectangularly box shaped, said housing comprising aluminum;
- a drive shaft rotationally coupled to and positioned through a first face of said housing, wherein a first end of said drive shaft extends from said first face of said housing, said first end being configured for coupling to a rotary tool;
- a plurality of second shafts rotationally coupled to and positioned through a second face of said housing, wherein a first terminus of each said second shaft extends from said second face of said housing, each said first terminus being configured for coupling to a drill bit, said plurality of second shafts comprising two said second shafts, each of said second shafts being elongated and oriented coplanar with said drive shaft;
- a plurality of couplers, each said coupler being coupled to said first terminus of a respective said second shaft, wherein each said coupler is positioned on a respective said second shaft such that said coupler is configured to couple a drill bit to said respective said second shaft, each said coupler comprising:
  - a collar coupled to said first terminus of respective said second shaft,
  - a penetration positioned through a wall of said collar, said penetration being threaded,
  - a grub screw complementary to said penetration, and
  - wherein said grub screw is positioned to thread into said penetration such that said grub screw is configured for tightening onto a respective drill bit positioned in said collar, such that the drill bit is coupled to said second shaft;
- a gear set positioned in said housing, said gear set being gearedly coupled to said drive shaft and each of said plurality of second shafts, said gear set being positioned is said housing such that each of said plurality of second shafts rotates in the same direction that said drive shaft is rotated, said gear set comprising:
  - an idler shaft rotationally coupled to and extending between said first face and said second face of said housing,
  - a first gear coupled to said idler shaft proximate to said first face,
  - a second gear coupled to said idler shaft proximate to said second face,
  - a drive gear coupled to said drive shaft proximate to a second end of said drive shaft, said drive gear being gearedly coupled to said first gear,
  - a pair of sprockets, each said sprocket being coupled to a respective said second shaft proximate to a second terminus of said respective said second shaft wherein each of said sprockets is positioned within a plane spaced from and parallel to said drive gear, a distance between outer edges of said sprockets being less than a diameter of said drive gear, said sprockets being gearedly coupled to said second gear, and
  - wherein said drive gear is positioned to compel rotation of said idler shaft, such that said idler shaft is positioned to compel rotation of said pair of sprockets and said second shafts, wherein the drill bits coupled to said first termini of said second shafts are rotated;
- said first gear, said second gear, said drive gear and said pair of sprockets comprising spur gears;
- said second face of said housing comprising a plate, said plate being reversibly couplable to said housing;
- a plurality of fasteners configured to reversibly couple said plate to said housing, said plurality of fasteners comprising four said fasteners, said plurality of fasteners comprising:
  - a plurality of first holes positioned through said plate proximate to a perimeter of said plate,
  - a plurality of second holes being positioned in a sidewall of said housing, said second holes being threaded, each said second hole being alignable with an associated said first hole,
  - a plurality of set screws, said set screws being complementary to said second holes, and
  - wherein each said second hole is positioned for alignment with said associated said first hole, such that a respective said set screw is positioned for insertion through said associated said first hole and screwed coupling to said sidewall to reversibly couple said plate to said housing; and
- wherein said grub screw is configured to tighten onto a respective drill bit positioned in said collar, such that the drill bit is coupled to said second shaft, wherein said first end of said drive shaft is configured to couple to a rotary tool, such that the rotary tool can compel rotation of said drive shaft, such that said drive gear is coupled to said drive shaft is positioned to compel rotation of said idler shaft, wherein said idler shaft is positioned to compel rotation of said pair of sprockets and said second shafts, such that drill bits coupled to said first termini of said second shafts are rotated concurrently with said drive shaft.

\* \* \* \* \*